United States Patent [19]

Nakade

[11] Patent Number: 4,944,078
[45] Date of Patent: Jul. 31, 1990

[54] SIZE VISCOSITY CONTROL METHOD AND CONTROLLER FOR SLASHERS

[75] Inventor: Kiyoshi Nakade, Komatsu, Japan
[73] Assignee: Tsudakoma Corp., Ishikawa, Japan
[21] Appl. No.: 363,989
[22] Filed: Jun. 9, 1989
[30] Foreign Application Priority Data Jun. 20, 1988 [JP] Japan .................................. 63-152031
Jul. 5, 1988 [JP] Japan .................................. 63-165902
Oct. 6, 1988 [JP] Japan .................................. 63-252557

[51] Int. Cl.⁵ .............................................. D06B 3/18
[52] U.S. Cl. ......................................... 28/183; 28/178
[58] Field of Search ................. 28/178, 179, 180, 181, 28/182, 183; 68/13 R

[56] References Cited

U.S. PATENT DOCUMENTS 4,364,157 12/1982 Cutts ...................................... 28/179
4,530,876 7/1985 Brodmann et al. ................ 28/179 X
4,793,035 12/1988 Nehrenberg et al. ................. 28/183

Primary Examiner—Werner H. Schroeder
Assistant Examiner—Bradley Kurtz DeSandro
Attorney, Agent, or Firm—Wenderoth, Lind & Ponack

[57] ABSTRACT

A size viscosity controller for a slasher, for controlling the viscosity of the size circulated within the sizing vat of the slasher. The viscosity of the size is maintained at a desired viscosity by controlling heat supply units on the basis of the deviation of the measured temperature of the size from a desired temperature so that the size is maintained at the desired temperature and, at the same time, regulating the concentration of the size by supplying wet heat, such as steam or hot water, to the size or heating the size by dry heat, such as heat generated by an electric heater, to regulated the concentration of the size.

10 Claims, 8 Drawing Sheets

SIZE VISCOSITY CONTROL METHOD AND CONTROLLER FOR SLASHERS

BACKGROUND OF THE INVENTION

1. Field of the Invention:

The present invention relates to a size viscosity control method and a controller for a slasher, for controlling the viscosity of size by regulating the temperature of the size.

2. Description of the Prior Art:

A slasher for preparing warp yarns for weaving immerses a running warp in size, and then squeezes the warp between squeezing rollers to apply an appropriate amount of the size to the warp. Size pick-up, namely, the quantity of size picked up by a warp yarn per unit weight of the warp yarn, is dependent on the running speed of the warp, squeezing pressure applied to the warp by the squeezing rollers, and the viscosity of the size. Accordingly, the size pick-up can be adjusted to a desired value by properly controlling factors affecting the size pick-up, such as the running speed of the warp, the squeezing pressure and the viscosity of the size.

The viscosity of the size, in particular, is the most significant factor affecting the size pick-up. The higher the viscosity, the lower the squeezing effect of the squeezing rollers and the lower the penetration of the size into the wap yarns. Therefore a size having an excessively high viscosity is unable to size warp yarn at a sufficiently high size pick-up and, even if applied to warp yarns at a sufficient size pick-up, adheres only to the surface of the warp yarns, and hence the cohesion and abrasion resistance of the sized warp yarns are insufficient entailing yarn breakage an size fall-off during weaving. Consequently, such an improperly sized warp reduces the weaving efficiency of the loom.

Ordinarily, the principal ingredient of a size for spun yarns is starch. Therefore such a starch-rich size has a comparatively high viscosity and the viscosity is liable to vary with time, and hence the stabilization of the viscosity of the starch-rich size is a particularly important requirement. Furthermore, since the appropriate temperature of the starch-rich size is as high as a temperature on the order of 90° C., water evaporates at a high rate from the surface of the starch-rich size contained in a size tank, and hence the viscosity and concentration of the size increase with time if the viscosity is not controlled properly.

Japanese Utility Model Publication No. 49-14994 discloses a size viscosity controller which controls the viscosity of the size at a fixed value by selectively mixing a size having a comparatively high viscosity or a size having a comparatively low viscosity into the size contained in the size tank so as to adjust the viscosity of the size to a desired value. However, it is practically difficult to prepare sizes of different qualities and to maintain the qualities of the sizes, and hence such a size viscosity controller has not yet been practiced.

SUMMARY OF THE INVENTION

Accordingly, it is an object of the present invention to provide a size viscosity controller capable of maintaining the viscosity of a size at a fixed value, which has been considered to be difficult, to enable uniform sizing of a warp obtain sized warp yarns of a high quality and improve the weaving efficiency of the loom.

Generally, the viscosity of a size is expressed as a function of temperature and concentration. That is, the viscosity of the size is substantially dependent on the temperature and concentration thereof. When other quality parameters of the size are fixed, the viscosity of the size increases as the temperature decreases or as the concentration increases and vice versa.

In a first aspect of the present invention, the temperature of a size contained in a cavity box is measured, a heat source is made to act on the size contained in the cavity box according to the deviation of the measured temperature from a desired temperature to maintain the temperature of the size at a desired value and, at the same time, the viscosity of the size is measured, an a hot medium containing moisture, such as steam of hot water, is mixed in the size according to the deviation of the measured viscosity from a desired viscosity or the size is heated by dry heat, such as heat generated by an electric heater or the like without supplying moisture to adjust the concentration of the size so that the size is maintained at the desired viscosity.

Thus, in the first aspect of the present invention, the temperature of the size is controlled mostly by heating the size with dry heat supplied by an electric heater or steam pipes (hereinafter referred to as "indirect heat source") to increase the viscosity of the size by increasing the concentration of the size through the evaporation of the water contained in the size, on the assumption that the temperature of the size is maintained at a fixed value, when the viscosity of the size is lower than the desired viscosity. On the other hand, when the viscosity of the size is higher than the desired viscosity, the temperature of the size is controlled mostly by heating the size with wet heat supplied by steam directly blown into the cavity box containing the size or hot water directly poured into the cavity box (hereinafter referred to as "direct heat source") to decrease the viscosity of the size by decreasing the concentration of the size.

The size viscosity controller in the first aspect of the present invention functions effectively in controlling the viscosity of a size for spun yarns, having a high desired temperature to maintain the concentration of the size at a fixed value at a high accuracy. The viscosity of the size is held substantially constant by holding the temperature and concentration of the size constant. Consequently, warp yarns are sized uniformly and stably, and thereby the loom is able to operate efficiently.

This size viscosity controller comprises two control systems, namely, a temperature control system and a concentration control system. The temperature control system is a constant temperature control system and hence the control range of viscosity of the temperature control system is narrow. Furthermore, when the temperature control system and the concentration control system operate respectively for opposite control effects, the response time increases.

In a second aspect of the present invention, in case the viscosity of the size has increased beyond the desired viscosity, the concentration control system increased the use of the direct heat source or decreases the use of the indirect heat source to increase the use of the direct heat source indirectly so that the decrease of the concentration is promoted by water supplied by the direct heat source. At the same time, the desired temperature for the temperature control system is raised to further promote the decrease of the viscosity by raising the temperature of the size. In case the viscosity of the size has decreased below the desired viscosity, the use of the direct heat source is decreased and the desired temperature is lowered to increase the viscosity of the size by the combined effect of increase in the concentration resulting from the reduction of water supplied by the direct heat source and increase in the viscosity resulting from the decrease of the temperature of the size, so that the accuracy of the viscosity control and the response speed are enhanced. Only the temperature or concentration of the size is not the controlled variable of the size viscosity controller; the size viscosity controller of the present invention controls both the temperature and concentration of the size. Accordingly, the viscosity of the size can be controlled in a wide range by varying the temperature and concentration of the size each in a small range.

In a third aspect of the present invention, a size viscosity controller measures the viscosity of the size and changes the desired temperature of the size on the basis of a measured viscosity to control the viscosity of the size at a fixed value. When the direct heat source, for example, steam, is used for controlling the temperature of the size, the concentration of the size is decreased and the temperature of the size is raised simultaneously and, consequently, the viscosity of the size is decreased by the simultaneous control of the temperature and the concentration. In the third aspect of the present invention, the viscosity of the size can be indirectly controlled by varying the temperature, which is in correlation with the viscosity, and the control of the temperature control is comparatively simple as compared with the direct control of the concentration. Accordingly the size viscosity controller in the third aspect of the present invention is effectively applicable to a practical slasher.

The use of steam as heat source in selective combination with heating means, such as an electric heater, and cooling means, such as water, for indirectly regulating the concentration of the size through the regulation of the temperature of the size enables the use of two dominant factors affecting the viscosity, namely, the temperature and the concentration, for controlling the viscosity. When wet heat, such as steam, is used for regulating the temperature of the size, the combined viscosity decreasing effect of the increase of the temperature and the decrease of the concentration enables quick viscosity control.

The above and other objects, features and advantages of the present invention will become more apparent from the following description taken in conjunction with the accompanying drawings.

DESCRIPTION OF THE PREFERRED EMBODIMENTS

Figure 1:
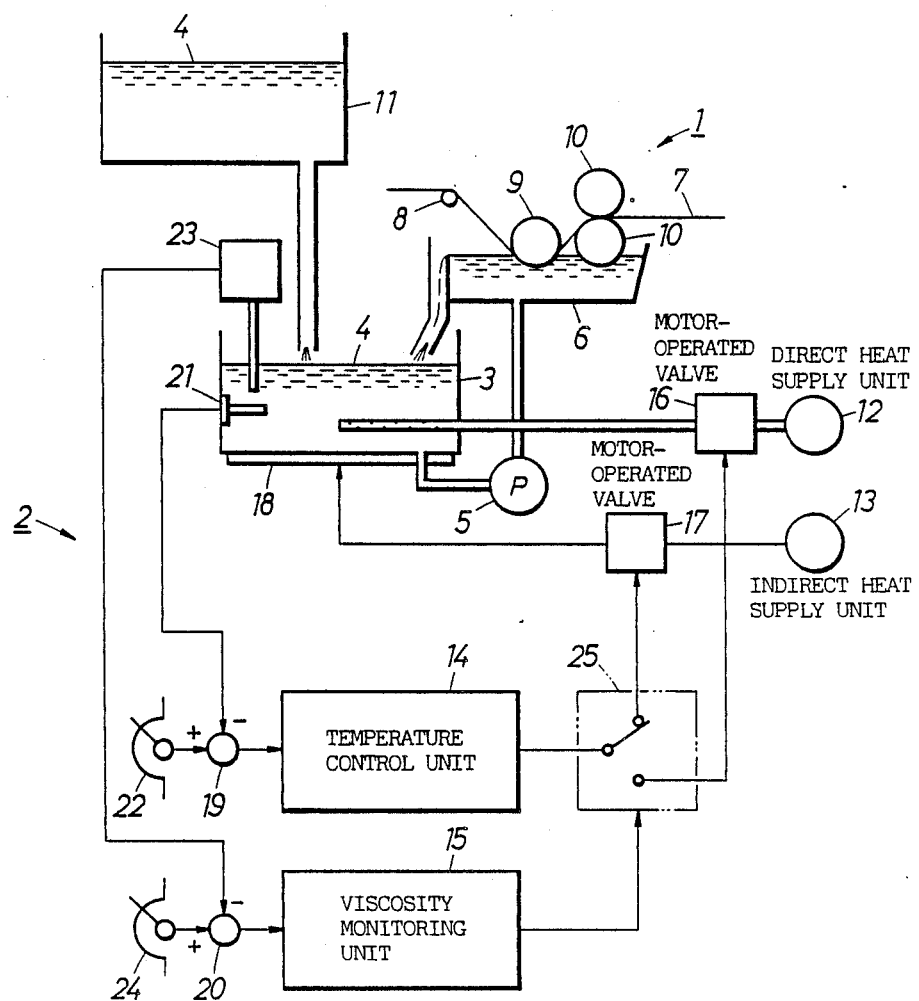
FIGS. 1 to 3 are block diagrams of size viscosity controllers in a first aspect of the present invention for a slasher.

First Embodiment (FIG. 1)

FIG. 1 shows the constitution of a size viscosity controller 2 in the first embodiment in relation with a slasher 1

In the slasher 1, a size 4 contained in a cavity box 3 is excessively supplied to a size vat 6 by a pump 5 so that the size 4 overflows the sizing vat 6 into the cavity box 3 A warp 7 guided by a guide roller 8 is immersed in the size 4 contained in the sizing vat 6 by a sizing roller 9, and then the warp 7 impregnated with the size 4 is squeezed by squeeze rollers 10. As the size 4 is consumed in the sizing vat 6, the size 4 of a predetermined concentration is supplied from a feed tank 11 into the cavity box 3.

The size viscosity controller 2 is provided with a direct heat supply unit 12, an indirect heat supply unit 13, a temperature control unit 14 and a viscosity monitoring unit 15. The direct heat supply unit 12 injects steam or hot water directly into the cavity box 3 containing the size 4 through a control element, such as a motor-operated valve 16 and a heat supply line to heat the size 4 and to supply water to the size 4. The indirect heat supply unit 13 supplies steam or a heating medium heated by an electric heater to a heat exchanger 18 combined with the cavity box 3 through a control element, such as a motor-operated valve, 17 and a heat supply line to heat the size 4 contained in the cavity box 3 indirectly.

A temperature detector 21 provided within the cavity box 3, and a temperature setting unit 22 are connected via a comparison point 19 to the temperature control unit 14. The temperature control unit 14 provides a temperature control signal in a PID control mode. A viscosity detector 23 for detecting the viscosity of the size 4, and a viscosity setting unit 24 ar connected via a comparison point 20 to the viscosity monitoring unit 15. The viscosity monitoring unit 15 gives a viscosity decison signal to a relay selector switch 25 to give the temperature control sinal selectively to the control element 16 or 17.

The temperature setting unit 22 sets a desired temperature for the size 4, and the viscosity setting unit 24 sets a desired viscosity for the size 4. The temperature detector 21 and the viscosity detector 23 detect the actual temperature and the actual viscosity of the size 4, respectively.

When the actual viscosity of the size 4 is lower than the desired viscosity, the viscosity monitoring unit 15 gives a viscosity decision signal according to the deviation of the actual viscosity from the desired viscosity to the selector switch 25 to connect the temperature control unit 14 to the control element 17. Then, when the actual temperature of the size 4 is lower than the desired temperature, the temperature control unit 14 gives a temperature control signal proportional to the deviation of the actual temperature from the desired temperature determined at the comparison point 19 to open the control element 17 by a degree corresponding to the deviation so that heat is supplied to the heat exchanger 18 by the indirect heat supply unit 13 to heat indirectly the size 4 contained in the cavity box 3. consequently, the concentration of the size 4 increases as water evaporates and thereby the viscosity approaches the desired viscosity. The heat exchanger 18 is in contact with the cavity box 3 by a large contact surface or the size 4 contained in the cavity box 3 is stirred in indirectly heating the size so that the size will not be heated locally.

When the actual viscosity of the size is higher than the desired viscosity, the viscosity monitoring unit 15 gives a viscosity decision signal to the selector switch 25 to connect the temperature control unit 14 to the control element 16. Then, when the temperature of the size 4 is lower than the desired temperature, the temperature control unit 14 gives a temperature control signal to the control element 16 to open the control element 16 by a degree proportional to the deviation of the actual temperature from the desired temperature. Then, steam or hot water is supplied by the direct heat supply unit 12 into the cavity box 3 to heat the size 4 directly and to supply water to the size 4, so that the viscosity of the size approaches the desired viscosity. In case the direct heating medium, i.e., steam or hot water, supplied into the cavity box 3 has large energy (enthalpy), it is possible that the actual temperature of the size 4 reaches the desired temperature immediately even if only a small amount of the direct heating medium is supplied into the cavity box 3 and the concentration is not decreased. In such a case, the concentration of the size 4 can be decreased sufficiently while the temperature of the size is regulated, by supplying steam of a comparatively low temperature or steam containing a comparatively large amount of water into the cavity box 3 or by cooling the size 4 while steam is supplied into the cavity box 3 to supply an increased amount of steam into the cavity box 3 without entailing significant rise in the temperature of the size 4.

In this embodiment and other embodiments which will be described hereinafter, the temperature detector 21, the viscosity detector 23, and the position where the heating medium supplied by the direct heat supply unit 12 or the indirect heat supply unit 13 acts effectively may be at any position in a path through which the size 4 is circulated, for example, within the sizing vat 6.

Figure 2:
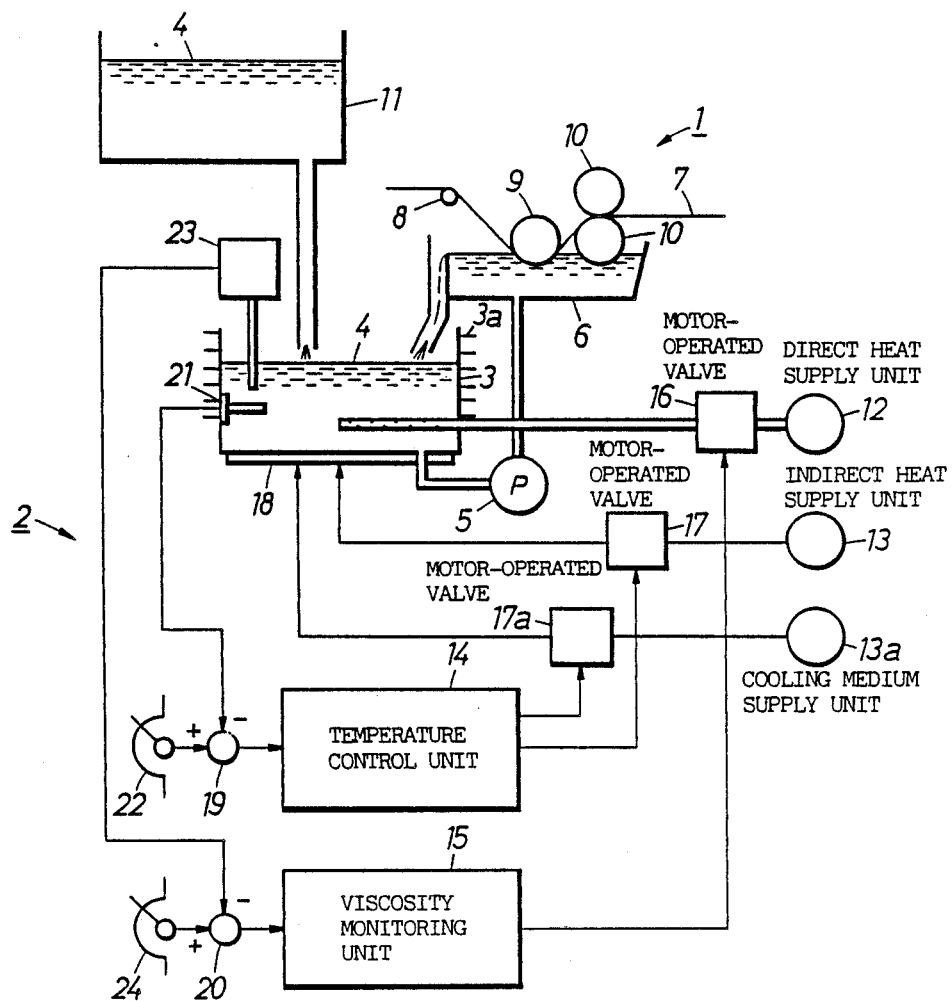

Second Embodiment (FIG. 2)

In the first embodiment, the viscosity monitoring unit 15 controls the selector switch 25 to control either the control element 16 or 17 selectively by the temperature control unit 14. A size viscosity controller in the second embodiment is provided with a viscosity monitoring unit 15 which controls a motor-operated control element 16 connected to a direct heat supply unit 12, and a temperature control unit 14 which controls a motor-operated control element 17 connected to a indirect heat supply unit 13 and a motor-operated control element 17a connected to a cooling medium supply unit 13a.

When the viscosity of the size 4 is excessively high, the viscosity monitoring unit 15 opens the control element 16 by a degree proportional to the deviation of the actual viscosity from the desired viscosity to heat the size 4 directly by a heating medium, such as steam or hot water, supplied by the direct heat supply unit 12 and to decrease the concentration of the size by supplying water thereto. When the viscosity of the size 4 is excessively low, the viscosity monitoring unit 15 stops the direct heating of the size 4 by closing the control element 16 to leave the concentration of the size 4 to increase of itself due to the evaporation of water from the size 4 entailing increase in the viscosity. The temperature control unit 14 controls the control element 17 in proportion to the deviation of the actual temperature of the size 4 from the desired temperature to maintain the size 4 at the desired temperature by supplying the heating medium to the size 4 from the indirect heat supply unit 13.

In the second embodiment, the cooling medium supply unit 13a can be used in combination with the direct heat supply unit 12 and the indirect heat supply unit 13, which enables quick response to large external disturbances.

The cavity box 3 may be provided with external heat radiating fins 3a or cold water may be supplied to a heat exchanger 18 provided on the cavity box 3 from the cooling medium supply unit 13a to cool the size 4 positively, when the viscosity of the size 4 cannot be decreased to the desired viscosity while the temperature of the size 4 is increased to the desired temperature, due to the excessive supply of heat energy as compared with the supply of water by the direct heating medium supplied from the direct heat supply unit 12.

Figure 3:
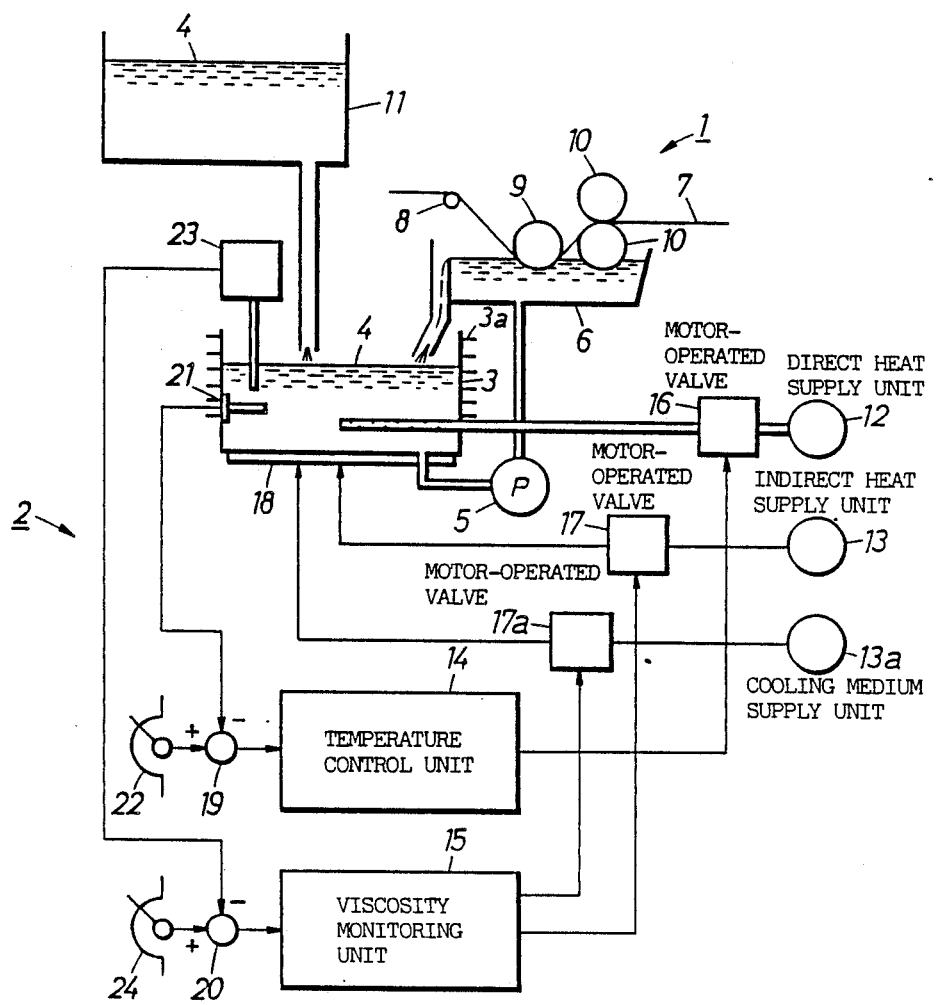

Third Embodiment (FIG. 3)

In a size viscosity controller in the third embodiment, a temperature control unit 14 controls only a control element 16 for directly supplying heat to the size 4 to control the temperature of the size 4. When the viscosity of the size 4 is excessively low, the temperature of the size 4 is likely to increase since a viscosity monitoring unit 15 promotes the evaporation of water from the size 4 by controlling a control element 17 to increase the supply of a heating medium supplied from an indirect heat supply unit 13, but at this time the temperature control unit 14 decreases the supply of direct heat to the size 4 to keep the temperature of the size 4 to a desired value. As a result the concentration of the size 4 is increased for thereby recovering the viscosity of the size 4 to the desired value. When the viscosity of the size 4 is excessively high, the viscosity monitoring unit stops the supply of heat from the indirect heat supply unit 13 or at the same time supply a cooling medium to a heat exchanger 18. As a result. the supply of water to the size 4 is increased for thereby decreasing the viscosity of the size 4 and recovering the viscosity of the size 4 to the desired value.

Inasmuch as the stop of the supply of heat from the indirect heat supply unit 13 and the supply of the cooling medium from the cooling medium supply unit 13a are carried out simultaneously, quick response to large external disturbances can be achieved.

Figure 4:
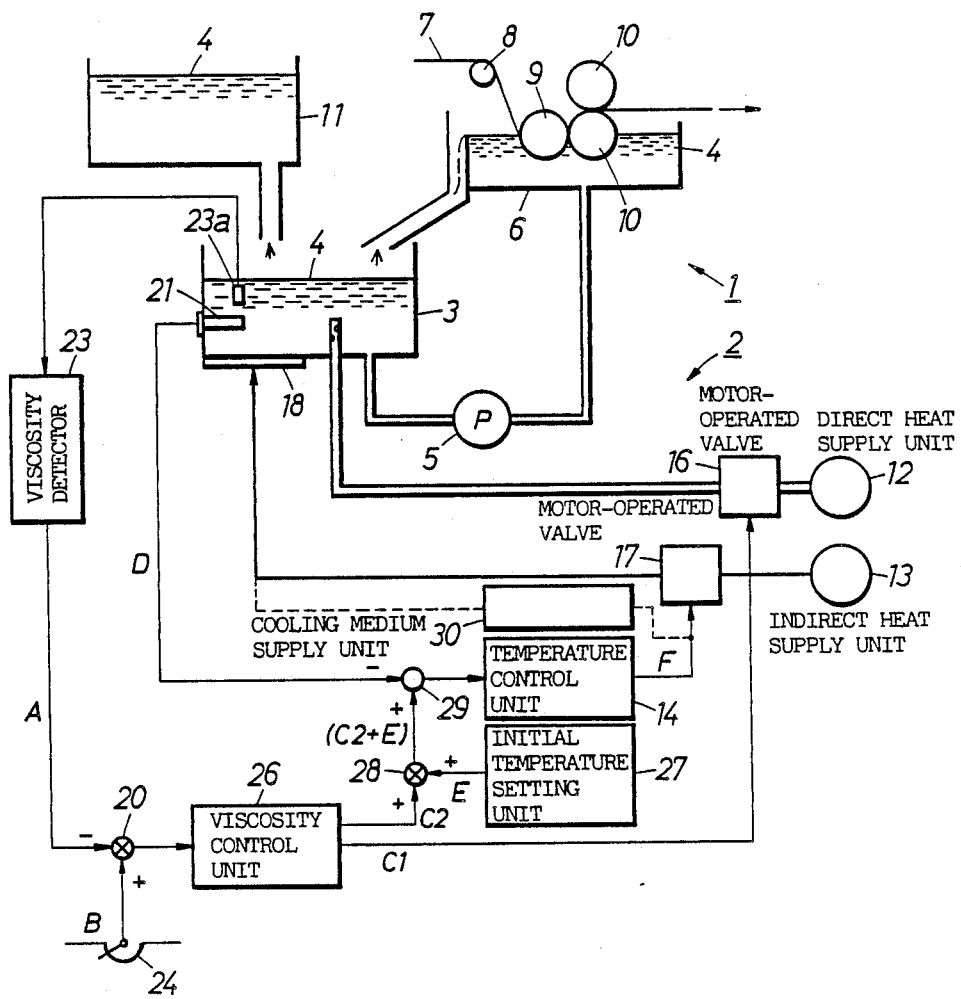
FIGS. 4 and 5 are block diagrams of size viscosity controllers in a second aspect of the present invention for a slasher.

Fourth Embodiment (FIG. 4)

A size viscosity controller in a fourth embodiment comprises a concentration control system and a temperature control system.

A viscosity detector 23, a viscosity setting unit 24 are connected through a comparison point 20 to the input of a viscosity control unit 26. The viscosity detector 23 has a detecting head 23a provided within a cavity box 3 containing a size 4 and provides an electric viscosity signal A representing the viscosity of the size 4 contained in the cavity box 3. A first output terminal of the viscosity control unit 26 is connected to a control element 16 connected to a direct heat supply unit 12 of the concentration control system. The direct heat supply unit 12 supplies hot water or steam having large thermal energy and containing sufficient water through a supply line into the cavity box 3 to heat the size 4 contained in the cavity box 3 directly and to supply water to the same.

A temperature detector 21 and an initial temperature setting unit 27 are connected through an add point 29 to the input of a temperature control unit 14 of the temperature control system. The output of the temperature control unit 14 is connected to a control element 17 connected to an indirect heat supply unit 13. The indirect heat supply unit 13 supplies steam or a heating medium heated by an electric heater through a supply path to a heat exchanger 18 connected to the external wall of the cavity box 3 to heat the size 4 indirectly.

A second output of the viscosity control unit 26 is connected to an add point 28, which is the most significant feature of the fourth embodiment.

The viscosity of the size 4 tends to increase with time during the operation of the slasher 1 due to increase in the concentration attributable to the natural evaporation of water from the surface of the size 4, or the decrease of the temperature. The temperature control unit 14 controls the control element 17 on the basis of the difference between a temperature signal D representing the actual temperature of the size provided by the temperature detector 21, and a set temperature signal E representing a desired temperature provided by the initial temperature setting unit 27 to maintain the size 4 at the desired temperature by supplying the heating medium from the indirect heat supply unit 13 to the heat exchanger 18 so that the size is maintained at the desired viscosity in respect of temperature.

On the other hand, the viscosity detector 23 detects the viscosity of the size 4 and applies a negative viscosity signal A proportional to the viscosity to the comparison point 20, where the viscosity sinal A representing the actual viscosity of the size 4 is compared with a set viscosity signal B representing the desired viscosity. When the actual viscosity of the size 4 coincides with the desired viscosity, the viscosity control unit 26 controls the control element 16 so as to supply the heating medium, i.e., steam or hot water, to the cavity box 3 at a rate corresponding to the rate of natural evaporation of water from the cavity box 3. If the viscosity exceeds the desired viscosity, a signal representing the deviation of the actual viscosity of the size 4 from the desired viscosity is given to the viscosity control unit 26. Then, the viscosity control unit 26 provides a concentration control signal C1 proportional to the deviation to open the control element 16 further in an integral control mode or a proportional control mode to supply the heating medium at an increased rate from the direct heat supply unit 12 into the cavity box 3 to heat the size directly and to supply water to the size 4. Consequently, the viscosity of the size 4 is decreased automatically.

At the same time, the viscosity control unit 26 applies a temperature control signal C2 corresponding to the deviation to an add point 28 to raise the desired temperature temporarily for the temperature control system. Consequently, the temperature control unit 14 controls the control element 17 to supply the heating medium continuously from the indirect heat supply unit 13 to the heat exchanger 18 to adjust the temperature of the size 4 to the temporary desired temperature, which is higher than the initial desired temperature by a degree corresponding to the temperature control sinal C2. Thus, the viscosity of the size 4 contained in the cavity box 3 is decreased rapidly owing to the rapid increase of the temperature thereof resulting from the supply of heat from both the direct heat supply unit 12 and the indirect heat supply unit 13, and the decrease of the concentration resulting from the increased supply of the heating medium containing water from the direct heat supply unit 12.

In case the temperature of the size 4 has been increased beyond the temperature desired temperature set by the temperature control system only bu the heat supplied from the direct heat supply unit 12, the temperature control unit 14 keeps the control element 17 inoperative not to supply heat from the indirect heat supply source to size 4. However, when necessary, a cooling medium may be supplied from a cooling medium supply unit 30 30 to the heat exchanger 18 to adjust the temperature of the size 4 to the temporary desired temperature. In such a control mode also, the viscosity is decreased rapidly by the viscosity reducing effect of the increased temperature and the concentration decreasing effect of the increased supply of the heating medium supplied by the direct heat supply unit 12, because the temporary desired temperature is higher than the initial desired temperature. In case the viscosity of the size has decreased below the desired viscosity, the viscosity control unit 26 provides a concentration control signal C1 proportional to the deviation of the actual viscosity from the desired viscosity to control the control element 16 so that the rate of supply of the heating medium supply from the direct heat supply unit 12 to the cavity box 3 is decreased. At the same time, the viscosity control unit 26 applies a temperature control signal C2 corresponding to the deviation to the add point 28 to lower the desired temperature for the temperature control system temporarily. Consequently, the viscosity of the size 4 increases rapidly due to the sharp drop of the temperature of the size 4 caused by the combined effect of decrease in the rate of heat supply from the direct heat supply unit 12 and the indirect heat supply unit 13, and due to increase in the concentration of the size 4 resulting from the insufficient supply of water to the size 4 as compared with the rate of evaporation of water from the size caused by decrease in the rate of supply of the heating medium from the direct heat supply unit, namely, decrease in the rate of supply of water.

Figure 5:
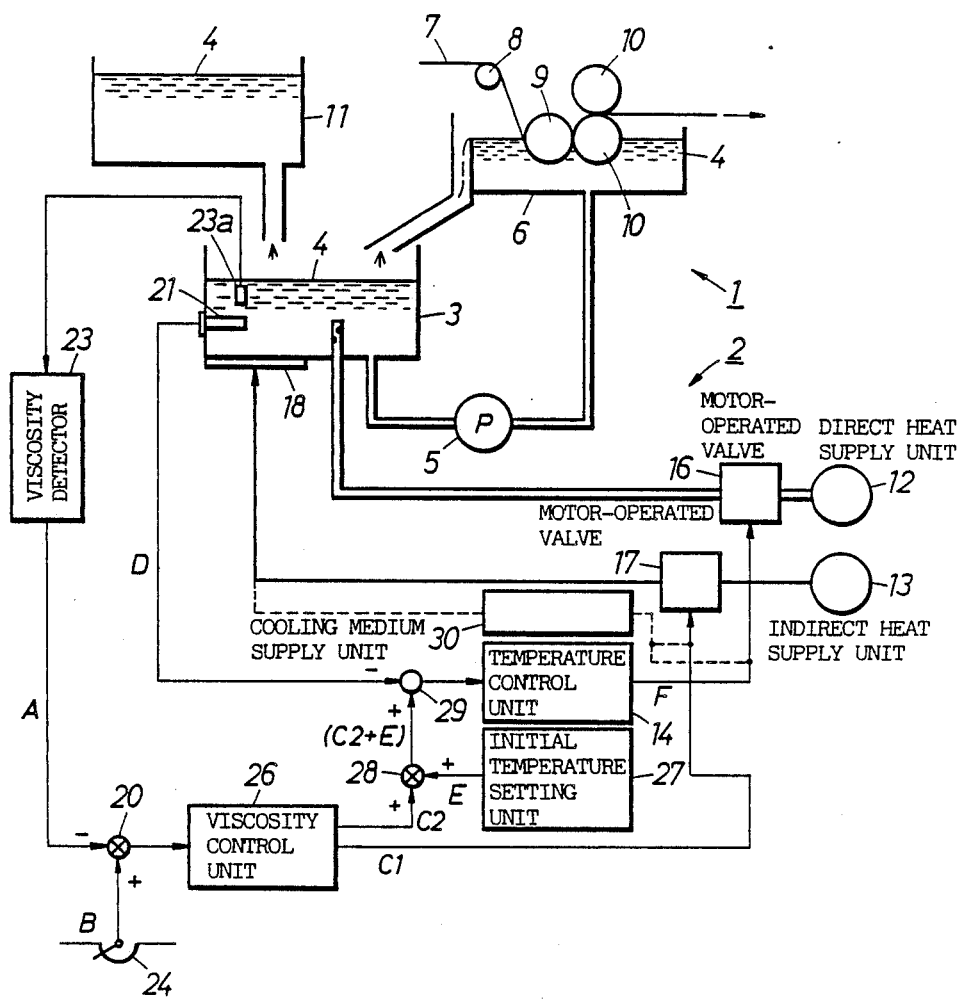

Fifth Embodiment (FIG. 5)

A size viscosity controller in a fifth embodiment, similarly to that in the fourth embodiment, comprises a concentration control system and a temperature control system. In the fifth embodiment, a viscosity control unit 26 is connected to a control element 17 connected to an indirect heat supply unit 13, and a temperature control unit 14 is connected to a control element 16 connected to a direct heat supply unit 12.

When the viscosity of the size 4 increases beyond a desired viscosity, the viscosity control unit 26 applies a concentration control signal C1 to reduce the variation of the deviation of the actual viscosity of the size 4 from the desired viscosity, namely, applies a plus output signal C1 if it receives the plus input signal. Accordingly, the amount of heat supplied from the indirect heat supply unit 13 is decreased with the decrease of variation of the deviation of the actual viscosity of the size 4 from the desired viscosity.

On the other hand, the viscosity control unit 26 applies a temperature control signal C2 to an add point 28 to change an initial desired temperature for a temporary desired temperature which is higher than the former. Then, the temperature control unit 14 controls the control element 16 to increase the rate of supply of heat from the direct heat supply unit 12 to the size 4 so that the temperature of the size 4 is adjusted to the temporary desired temperature. In this state, the amount of heat supplied by the direct heat supply unit 12 is increased by an increment equal to the sum of an amount of heat necessary for compensating the decrease of heat supplied by the indirect heat supply unit 13, and an amount of heat necessary for increasing the temperature of the size 4 to the temporary desired temperature which is higher than the initial desired temperature. Thus, the size 4 is heated by the increased heat supplied by the direct heat supply unit 12 and hence water is supplied at an increased rate to the size 4, so that the viscosity of the size 4 is decreased rapidly.

In case the viscosity of the size 4 has decreased below the desired viscosity, the viscosity control unit 26 gives a concentration control signal Cl to reduce the variation of the deviation of the actual viscosity of the size 4 from the desired viscosity, namely, applies a plus output signal Cl when it receives the plus input signal to the control element 17 to supply heat from the indirect heat supply source 13 at an increased heat supply rate and, at the same time, the viscosity control unit 26 provides a temperature control signal C2 corresponding to the deviation to change an initial desired temperature for a temporary desired temperature which is lower than the former. Consequently, the amount of heat supplied by the direct heat supply unit 12 is decreased by a large decrement equal to the sum of an increment of heat supplied by the indirect heat supply unit 13 and an amount of heat to be curtailed to adjust the temperature of the size 4 to the temporary desired temperature lower than the initial desired temperature. Thus, the viscosity of the size 4 is increased rapidly by the sharp drop of the temperature of the size 4 caused by the curtailment of the amount of heat supplied by the direct heat supply unit 12, and the sharp increase of the concentration due to the curtailment of the amount of water supplied to the size 4.

In case the temperature of the size increases beyond the temporary desired temperature while the size 4 is heated only by the heat supplied by the indirect heat supply unit 13, the temperature control unit 14 employs a cooling medium supply unit 30 to cool the size 4. In case the viscosity of the size 4 remains higher than the desired viscosity despite the interruption of heat supply from the indirect heat supply unit 13, the viscosity control unit 26 gives the concentration control signal Cl to supply a cooling medium from the cooling medium supply unit 30 to the heat exchanger 18 so that the heat supply rate of the direct heat supply unit 12, hence the water supply rate, is increased to promote the decrease of the viscosity.

As explained hereinbefore, since the temperature, concentration and viscosity of the size are closely correlative, an initial viscosity may be the viscosity of the size 4 first supplied into the cavity box 3 and heated at the initial desired temperature. That is, a viscosity detected by the viscosity detector 33 in the initial stage of sizing operation after the temperature of the size 4 has been adjusted to the initial desired temperature set by the temperature setting unit 27 may be stored in memory means and may be used as a desired viscosity to be set the viscosity setting unit 24.

Figure 6:
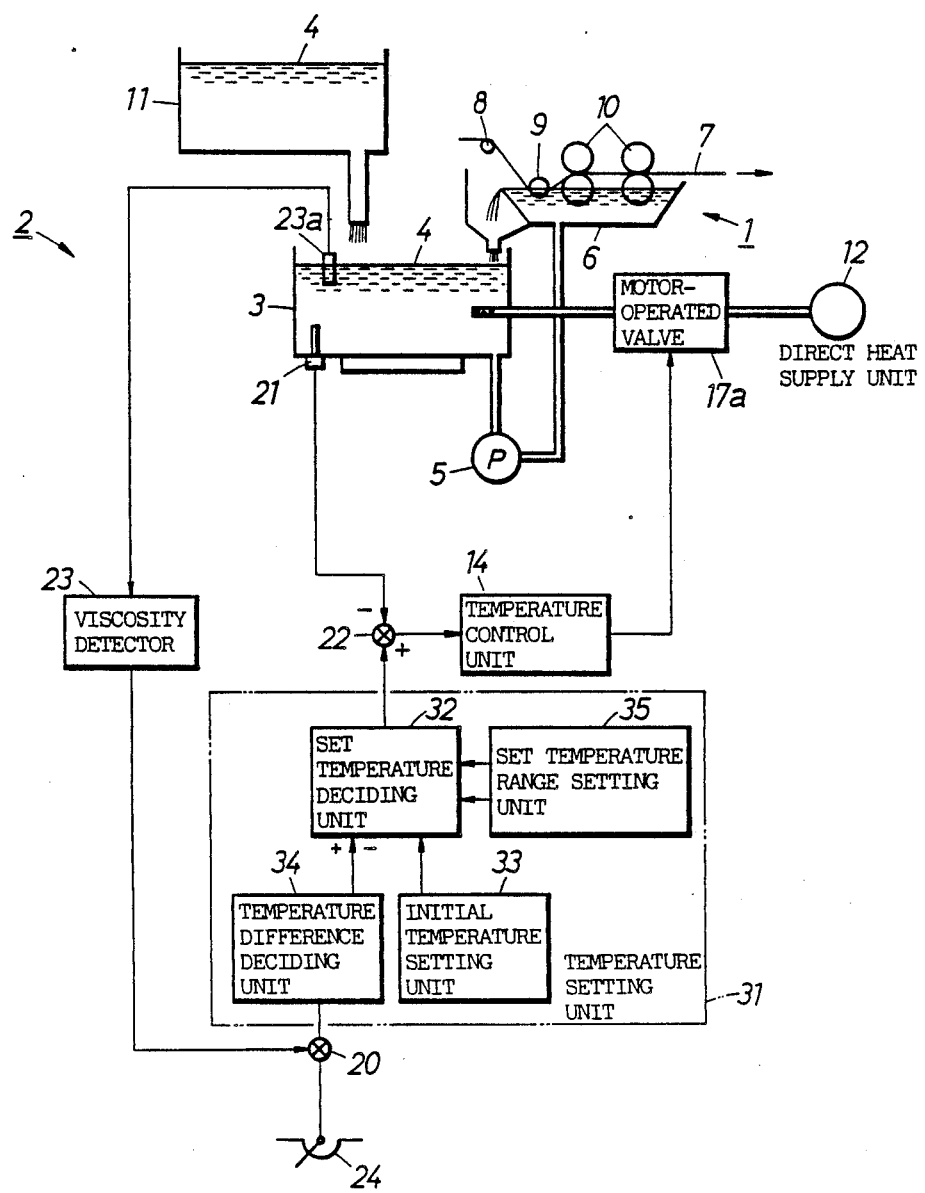
FIG. 6 and 7 are block diagrams of size viscosity controllers in a third aspect of the present invention for a slasher.

Sixth Embodiment (FIG. 6)

A size viscosity controller in a sixth embodiment is provided with a special temperature setting unit 31.

The temperature setting unit 31 comprises a set temperature deciding unit 32, an initial temperature setting unit 33, and a temperature difference deciding unit 34 for converting viscosity deviation into a corresponding temperature difference. The input of the temperature difference deciding unit 34 is connected through a viscosity comparison point 20 to a desired viscosity setting unit 24 and a viscosity detector 23. The set temperature deciding unit 32 is connected through a temperature comparison point 22 to the input of a temperature control unit 14. The output of a temperature detector 21 is connected to the comparison point 22. The set temperature deciding unit 32 decides a set temperature in a temperature range between an upper limit temperature and a lower limit temperature predetermined by a set temperature range setting unit 35. The upper limit temperature is near and below the boiling point of the size 4, and the lower limit temperature is decided taking into consideration a temperature at which oils coating the surface of warp yarns of warp 7, and cotton wax are dissolvable in the size 4, namely, a temperature at which the size 4 is able to permeate the warp yarns of the warp 7.

First, the initial temperature setting unit 33 sets an initial temperature appropriate to making the viscosity of the size 4 converge rapidly on a desired viscosity set by the viscosity setting unit 24. A signal representing the initial temperature set by the initial temperature setting unit 33 is given through the set temperature deciding unit 32 and a comparison point 22 to the temperature control unit 14. Then, the temperature control unit 14 controls a control element 16 so that a direct heating medium, in this embodiment, steam, is supplied from a direct heat supply unit 12 at a maximum rate into a cavity box 3 containing the size 4 to heat the size 4. The temperature detector 21 detects the temperature of the size 4 and applies a signal representing the actual temperature of the size 4 to the comparison point 22. The temperature control unit 14 controls the control element 16 on the basis of the deviation of the actual temperature of the size 4 from the initial temperature to regulate the rate of supply of steam so that the temperature of the size 4 approaches the initial temperature, and thereby the viscosity of the size 4 converges on the desired viscosity or a viscosity near the desired viscosity as the temperature approaches the initial temperature. Since steam is supplied as a direct heating medium to the cavity box 3 to control the temperature of the size 4, water, as well as heat, is supplied to the size 4 in heating the same. If the rate of supply of water in the form of steam coincides with the rate of evaporation of water from the cavity box 3, the concentration of the size 4 contained in the cavity box 3 is maintained substantially at a fixed value. Accordingly, the viscosity of the size 4 is maintained at the fixed value both by supplying water to the size 4 and by controlling the temperature of the size 4.

If the viscosity of the size 4 coincides with the desired viscosity when the size 4 is heated at the initial temperature, the size 4 is maintained at the initial temperature. The desired viscosity is decided specially for the size 4 so that the warp yarns are sized at an optimum size pic-up. When the viscosity of the size 4 exceeds the desired viscosity, the comparison point 20 gives a temperature signal corresponding to the difference between the actual viscosity of the size 4 detected by the viscosity detector 23, and the desired viscosity set by the viscosity setting unit 24 to the temperature difference deciding unit 34. Then, the temperature difference deciding unit 34 gives a temperature difference signal, in this case, a temperature increment signal, to the set temperature deciding unit 32. Then, the set temperature deciding unit 32 gives a signal representing a desired temperature obtained by adding a temperature represented by the temperature increment signal to the initial set temperature to the temperature control unit 14. Then, the temperature control unit 14 controls the control element 16 to raise the temperature of the size 4 by supplying steam to the same. As the temperature of the size 4 increases, the viscosity of the size 4 decreases. Since the higher the set temperature of the size 4, the greater the heat dissipation from the size 4, steam is supplied at an increased rate into the cavity box 3, and thereby the concentration of the size 4 tends to decrease. Accordingly, the viscosity of the size 4 is decreased by the combined effect of increase in the temperature of the size 4 and decrease in the concentration of the same, and the viscosity of the size is stabilized at the desired viscosity after the temperature of the size 4 has been increased by a temperature increment.

When the viscosity of the size 4 is below the desired viscosity, the set temperature is lowered and the steam supply rate is decreased. In this case, the viscosity of the size 4 is increased by the combined effect of decrease in the temperature and decrease in the steam supply rate. The viscosity of the size 4 is stabilized at the desired viscosity after the temperature has dropped by a temperature decrement.

The viscosity of the size is not necessarily increased even if the steam supply rate is increased to heat the size 4 to the raised set temperature, if the rate of evaporation of water from the size exceeds the rate of increase of water supplied by steam. Therefore, the cavity box 3 is designed so that the surface of the size 4 contained therein is comparatively small and heat is dissipated at a high rate from the walls thereof to reduce the evaporation of water from the size 4 and to increase the effective amount of water supplied to the size 4 by supplying steam into the cavity box 3. Thus, the viscosity of the size 4 can be controlled effectively through the control of the concentration.

Thus, the viscosity of the size 4 can be decreased by the combined effect of the water supplied together with steam into the cavity box 3 and the increase of the temperature of the size 4 by heat of steam. The direct heating medium supplied by the direct heat supply unit 12 may be either steam or hot water depending on the set temperature of the size 4.

Figure 7:
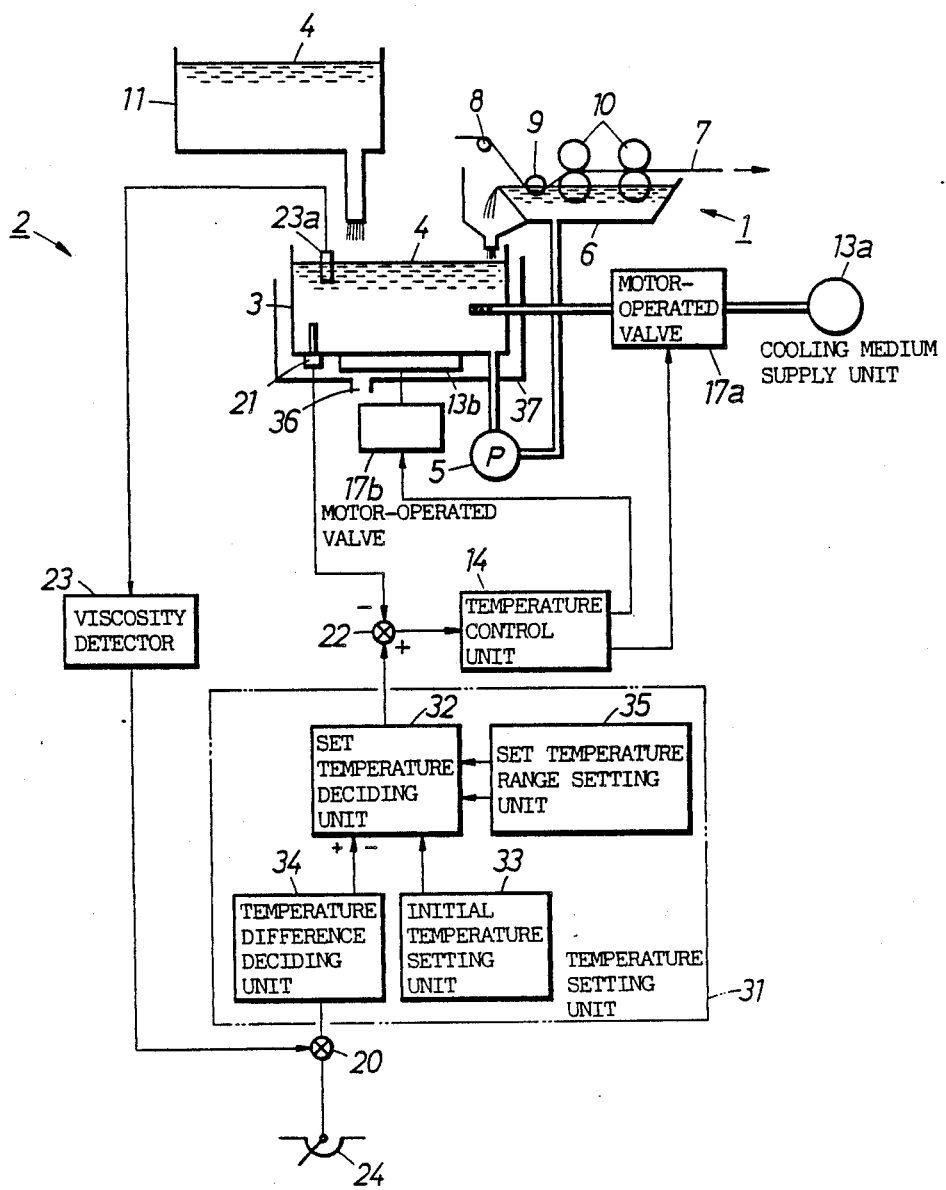

Seventh Embodiment (FIG. 7)

A size viscosity controller in a seventh embodiment is provided with an indirect heat supply unit 13 employing an electric heater 13b, a cooling medium supply unit 13a having a water jacket 37 having an outlet port 36 and enclosing the cavity box 3, and control element 17b and 17a connected respectively to the electric heater 13b and a cooling medium supply unit 13a.

A temperature control unit 14 controls the control element 17a according to the variation of the viscosity of the size 4, for example, in a proportional control made to regulate a current supplied to the electric heater 13b.

When the viscosity of the size 4 exceeds a desired viscosity, the temperature control unit 14, similarly to the temperature control unit 14 of the sixth embodiment, controls the control element 17b so as to increase the current supplied to the electric heater 13b to raise the temperature of the size 4. Although the concentration of the size 4 tends to increase entailing increase in the viscosity of the size 4 due to increase in the rate of evaporation of water from the size 4 when the temperature of the size 4 is increased, the effect of the evaporation of water on increase in the concentration of the size 4 contained in the cavity box 3 is insignificant, because a new size 4 is supplied from time to time from a size supply tank 11 into the cavity box 3.

When the viscosity of the size 4 decreases below the desired viscosity, the temperature control unit 14 controls the control element 17a so as to decrease the current supplied to the electric heater 13b according to the reduction of the viscosity, and controls the control element 17b as to supply water of allow temperature into the water jacket 37 to cool the size 4 contained in the cavity box 3 to lower temperature. Thus, viscosity of the size 4 is increased rapidly by the combined effect of natural decrease in temperature of the size 4 resulting from decrease in the current supplied to the electric heater 13b, the replenishment of the cavity box 3 with the size 4 of a temperature lower than that of the size 4 contained in the cavity box 3, supplied from the size supply tank 11, and the positive cooling of the size 4 by the low-temperature water supplied into the water jacket 37.

In the seventh embodiment, the actual temperature of the size 4 is detected and the temperature of the size 4 is controlled accurately in a feedback control mode, however, the temperature of the size 4 may be controlled in an open loop control mode.

Figure 8:
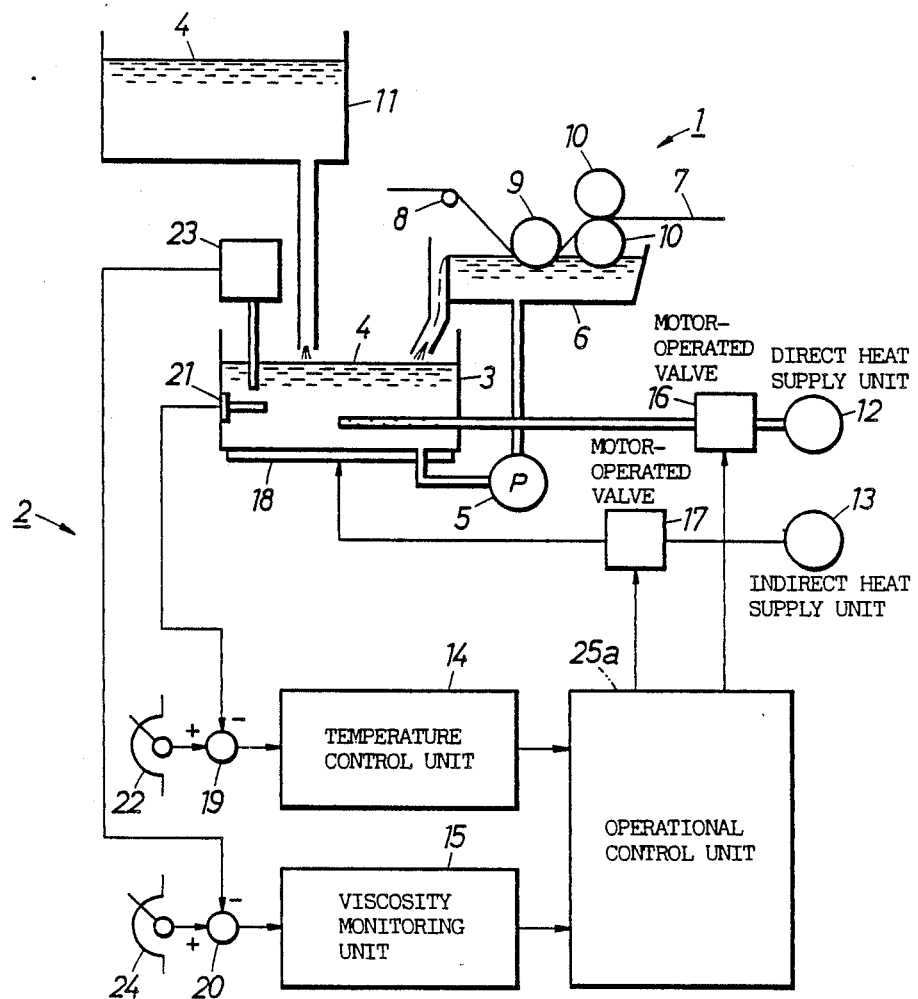
FIG. 8 is another block diagram of a size viscosity controller in the first aspect of the present invention.

Eighth Embodiment (FIG. 8)

In the foregoing embodiments, either the direct heat supply unit 12 or the indirect heat source supply unit 13 is used selectively. In a size viscosity controller in an eighth embodiment according to the present invention a direct heat supply unit 12 and an indirect heat supply source 13 are used simultaneously to cancel the deviation of the actual viscosity of the size 4 from a desired viscosity. The ratio in heat supply rate between the direct heat supply unit 12 and the indirect heat supply unit 13 is regulated according to the deviation by an operational control unit 25a instead of the selector switch 25 employed in the foregoing embodiments. For example, in order not to disturb the temperature of the size 4 when the viscosity of the size 4 is high, the amount of the heat supplied from the direct heat supply unit 12 is increased for the amount of Q and the amount of heat supplied from the indirect heat supply unit 13 is decreased for the amount of Q. In case only the temperature of the size 4 is deviated from the desired temperature, the operational control unit 25a does not vary the ratio in heat supply rate between the direct heat supply unit 12 and the indirect heat supply unit 13 but varies the total amount of the direct and indirect heat or ratio in heat supply rate of the indirect heat supply unit 13. In case the viscosity and temperature of the size 4 are deviated from the desired viscosity and temperature, the operational control unit 25a decides the ratio in heat supply rate between the direct heat supply unit 12 and the indirect heat supply unit 13 on the basis of the temperature deviation given thereto by a temperature control unit 14 and the viscosity deviation given thereto by a viscosity control unit 15 taking into account the total amount of heat before controlling or the condition of use of the heat supplied by the direct heat supply unit 12 and the indirect heat supply unit 13 and controls a control element 16 connected to the direct heat supply unit 12 and a control element 17 connected to the indirect heat supply unit 13 so that direct heat and indirect heat are supplied at the calculated ratio.

In this control mode, the viscosity of the size 4 is controlled smoothly because the manipulated variables are varied moderately.

Although the invention has been described in its preferred form with a certain degree of particularity, it is to be understood that many variations and changes are possible in the invention without departing from the scope thereof.

What is claimed is:

1. A method of controlling the viscosity of size for a slasher, employing a temperature control unit for maintaining the temperature of the size at a desired temperature, a direct heat supply unit for supplying wet heat containing water to the size, and an indirect heat supply unit for supplying dry heat to the size; characterized in that the heat supply ratio between the direct heat supply unit and the indirect heat supply unit is regulated on the basis of the deviation of the actual viscosity of the size measured by a viscosity detector from a predetermined desired viscosity so that the deviation is decreased.

2. A method of controlling the viscosity of size for a slasher, employing a temperature control unit for regulating the temperature of the size, a temperature setting unit for setting a desired temperature for the size, a direct heat supply unit for supplying wet heat containing water to the size in heating the same, and an indirect heat supply unit for supplying dry heat to the size to heat the same; characterized in that the level of the output signal of the temperature setting unit and the ratio in heat supply rate between the direct heat supply unit and the indirect heat supply unit are regulated on the basis of the deviation of an actual viscosity of the size detected by a viscosity detector from a predetermined desired viscosity so that the deviation is decreased.

3. A size viscosity controller for a slasher which supplies size into a cavity box, circulates the size through the cavity box and a sizing vat, and immerses a running warp in the size contained in the sizing vat to size the warp yarns of the warp, comprising: a temperature detector for detecting the temperature of the size circulated within the sizing vat; a temperature control unit which provides a temperature control signal on the basis of the deviation of an actual temperature of the size detected by the temperature detector from a desired temperature; a viscosity detector for detecting the viscosity of the size circulated within the sizing vat; a viscosity deciding unit which provides a viscosity decision signal based on the deviation of an actual viscosity of the size detected by the viscosity detector from a desired viscosity; a direct heat supply unit which supplies wet heat containing water to the size to heat the same; an indirect heat supply unit which supplies dry heat to the size to heat the same; a first control element connected to the direct heat supply unit to control heat supply from the direct heat supply unit to the size; a second control element connected to the indirect heat supply unit to control heat supply from the indirect heat supply unit to the size; and a selector switch for selectively connecting the temperature control signal provided by the temperature control unit according to the viscosity decision signal provided by the viscosity deciding unit to either the first control element or the second control element to supply wet heat from the direct heat supply unit to the size when the viscosity of the size is higher than the desired viscosity or to supply dry heat from the indirect heat supply unit to the size when the viscosity of the size is lower than the desired viscosity.

4. A size viscosity controller for a slasher which supplies size into a cavity box, circulates the size through the cavity box and a sizing vat, and immerses a running warp in the size contained in the sizing vat to size the warp yarns of the warp, comprising: a temperature detector for detecting the temperature of the size circulated within the sizing vat; a temperature control unit which provides a temperature control signal on the basis of the deviation of an actual temperature of the size detected by the temperature detector from a desired temperature; a viscosity detector for detecting the viscosity of the size circulated within the sizing vat; a viscosity deciding unit which provides a viscosity decision signal on the basis of the deviation of an actual viscosity of the size detected by the viscosity detector from a desired viscosity; a direct heat supply unit which supplies wet heat containing water to the size to heat the same; an indirect heat supply unit which supplies dry heat to the size to heat the same; a first control element connected to the direct heat supply unit to control heat supply from the direct heat supply unit to the size according to a viscosity control signal given thereto from the viscosity deciding unit when the viscosity of the size is higher than the predetermined desired viscosity; and a second control element connected to the indirect heat supply unit to control heat supply from the indirect heat supply unit to the size according to a temperature control signal given thereto from the temperature control unit.

5. A size viscosity controller for a slasher which supplies size into a cavity box, circulates the size through the cavity box and a sizing vat, and immerses a running warp in the size contained in the sizing vat to size the warp yarns of the warp, comprising: a temperature detector for detecting the temperature of size circulated within the sizing vat; a temperature control unit which provides a temperature control signal on the basis of the deviation of an actual temperature of the size detected by the temperature detector from a desired temperature; a viscosity detector for detecting the viscosity of the size circulated within the sizing vat; viscosity deciding unit which provides a viscosity decision signal on the basis of the deviation of an actual viscosity of the size detected by the viscosity detector from a desired viscosity; a direct heat supply unit which supplies wet heat containing water to the size to heat the same; an indirect heat supply unit which supplies dry heat to the size to heat the same; a first control element connected to the direct heat supply unit to control heat supply from the direct heat supply unit to the size according to a temperature control signal given thereto from the temperature control unit; and a second control element connected to the indirect heat supply unit to supply heat to the size according to a viscosity control signal given thereto from the viscosity deciding unit when the viscosity of the size is lower than the desired viscosity.

6. A size viscosity controller for a slasher which supplies size into a cavity box, circulates the size through the cavity box and a sizing vat, and immerses a running warp in the size contained in the sizing vat to size the warp yarns of the warp, comprising: a viscosity setting unit for setting a desired viscosity for the size; a viscosity detector for detecting the viscosity of the size circulated within the sizing vat; a viscosity control unit which provides a concentration control signal and a temperature control signal on the basis of the deviation of an actual viscosity of the size represented by a viscosity signal provided by the viscosity detector from a desired viscosity represented by a desired viscosity signal provided by the viscosity setting unit; a direct heat supply unit for supplying wet heat containing water to the size to heat the same; an indirect heat supply unit for supplying dry heat to the size to heat the same; a first control element connected to the direct heat supply unit to supply wet heat from the indirect heat supplying unit to the size according to the concentration control signal provided by the viscosity control unit; an initial temperature setting unit for setting an initial desired temperature for the size; a temperature detector for detecting the temperature of the size circulated within the sizing vat; a temperature control unit which provides a temperature control signal on the basis of the sum of a desired temperature signal provided by the initial desired temperature setting unit, a temperature signal provided by the temperature detector and a temperature control signal provided by the viscosity control unit; and a second control element connected to the indirect heat supply unit to supply dry heat to the size to heat the same according to the temperature control signal given thereto from the temperature control unit.

7. A size viscosity controller for a slasher which supplies size into a cavity box, circulates the size through the cavity box and a sizing vat, and immerses a running warp in the size contained in the sizing vat to size the warp yarns of the warp, comprising: a viscosity setting unit for setting a desired viscosity for the size; a viscosity detector for detecting the viscosity of the size circulated within the sizing vat; a viscosity control unit which provides a concentration control signal and a temperature control signal on the basis of the deviation of an actual viscosity of the size represented by a viscosity signal given thereto from the viscosity detector from a desired viscosity represented by a desired viscosity signal provided by the viscosity setting unit; an initial desired temperature setting unit for setting an initial desired temperature for the size; a temperature detector for detecting the temperature of the size circulated within the sizing vat; a temperature control unit which receives a signal representing the sum of an initial desired temperature signal representing the initial desired temperature provided by the initial desired temperature setting unit, a temperature signal provided by the temperature detector and a temperature control signal provided by the viscosity control unit, and provides a temperature control signal; a first control element connected to the direct heat supply unit to supply wet heat to the size according to the temperature control signal given thereto from the temperature control unit; and a second control element connected to the indirect heat supply unit to supply dry heat to the size at least according to the concentration control signal inverse to the deviation of the viscosity of the sie form the desired viscosity in the direction of variation.

8. A size viscosity controller for a slasher which supplies size into a cavity box, circulates the size through the cavity box and a sizing vat, and immerses a running warp in the size contained in the sizing vat to size the warp yarns of the warp, comprising: a desired viscosity setting unit for setting a desired viscosity for the size circulated within the sizing vat; a viscosity detector for detecting the viscosity of the size circulated within the sizing vat; a viscosity comparison point for determining the deviation of an actual viscosity of the size detected by the viscosity detector from a desired viscosity set by the desired viscosity setting unit; a temperature setting unit which provides a temperature control signal on the basis of the deviation determined by the viscosity comparison point; and control elements controlled by the temperature control signal provided by the temperature setting unit to supply heat from heat supply units to the size.

9. A size viscosity controller for a slasher, according to claim 8, wherein the heat supply units are either direct heat supply units or indirect heat supply units.

10. Size viscosity controller for a slasher, according to claim 8, wherein the heat supply units supply indirect heating medium heated by an electric heater and water of a temperature lower than the desired temperature.

* * * * *